Nov. 26, 1935.  E. SPAHN  2,022,392

TEMPERATURE COMPENSATED INDUCTION METER

Filed June 21, 1934

Inventor
Emil Spahn
by Morgan, Finnegan and Durham
Attorneys.

Patented Nov. 26, 1935

2,022,392

UNITED STATES PATENT OFFICE 2,022,392

TEMPERATURE COMPENSATED INDUCTION METER

Emil Spahn, Zug, Switzerland, assignor to Landis & Gyr, A-G., a corporation of Switzerland Application June 21, 1934, Serial No. 731,582
In Switzerland July 28, 1933

4 Claims. (Cl. 171—264)

The present invention relates to induction meters and more particularly to a novel and improved temperature-compensated induction meter, such as a watthour meter.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part thereof, illustrates one embodiment of the invention, and together with the description, serve to explain the principles of the invention.

Figure 1:
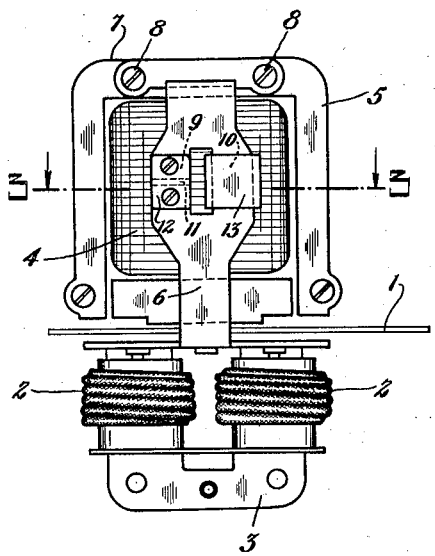
Figure 1 is a rear elevation of an illustrative embodiment of the present invention.
Figure 2:
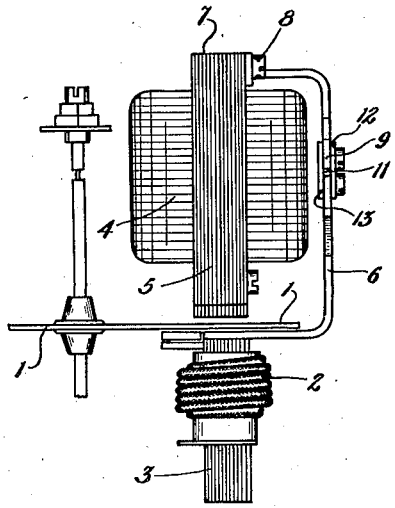
Figure 2 is a side elevation of the embodiment shown in Figure 1.
Figure 3:
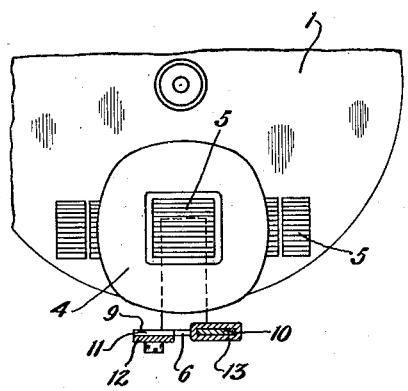
Figure 3 is a cross section taken on the line 3—3 of Figure 1.

The present invention has for its object the provision of an improved temperature-compensated induction meter which will operate satisfactorily with different kinds of loads and at loads of different magnitudes. A further object of the invention is the provision of a temperature-compensated induction meter which can be easily constructed using commercial grades of thermo-sensitive alloys which often vary in their magnetic properties.

In accordance with the illustrative embodiment of the invention, the induction meter comprises a metering disc, and current and voltage coils and cores, to produce a rotating field which drives the disc proportionally to the load being measured by the meter. The voltage magnet is provided with a branch which carries the lagging portion of the return magnetic flux, and this branch is sub-divided to provide two parallel branches, one of which is surrounded by a short-circuited winding, while the other is formed with an air gap which is bridged by a thermally-sensitive alloy having a negative temperature coefficient of permeability.

Heretofore, induction meters have been constructed with the temperature compensating means so arranged that it will affect either the braking flux or the driving flux. However, the temperature error of an induction meter is generally different with ohmic and inductive loads so that proper compensation is obtained only at certain definite phase relations of the current. With the thermally sensitive alloys arranged to effect the compensation in the driving flux, the compensation is to a large extent dependent upon the kind of load being measured, while with compensation in the current driving flux, the load curve is generally poor, and the compensation is largely dependent upon the magnitude of the load. Where the thermally sensitive alloys have been arranged in the pressure driving flux so as to alter the stray field induction of a short circuited ring, this compensation affects only the phase of the driving flux.

By sub-dividing a part of the pressure driving flux into two parallel branches, in accordance with the present invention, and by compensating each of these branches, a temperature compensation is obtained which is independent of the magnitude of the load as well as the phase relation of the current forming the load.

It will be understood that the foregoing general description and the following detailed description as well are exemplary and explanatory of the invention but are not restricted thereon.

Referring now in detail to the illustrative embodiment of the invention as shown in the accompanying drawing, the invention is shown as applied to a watthour meter of the Ferraris type comprising a metering disc 1 which is rotated substantially proportionally to the consumption of power in the circuit being measured by means of a rotating field produced by the current coils 2 and core 3 and the voltage coil 4 and core 5, all of conventional construction. A branch 6, in the form of a C-shaped member, carries the lagging portion of the return magnetic flux and is fixed to the yoke 7 of the voltage core 5 by means of the screws 8, and this branch is divided intermediate its ends and substantially at its middle part so that two paths 9 and 10 are formed. The path 9 is preferably interrupted to provide an air gap 11 which is bridged by means of a small plate 12 of thermally sensitive alloy having a negative temperature coefficient of permeability, while the part forming the path 10 is encircled by a short circuited winding 13.

The paths 9 and 10 are preferably so constructed that the fluxes in these paths are of substantially equal magnitude, and the thickness and width of the plate 12 are so proportioned as to produce the proper amount of compensation, having in mind the particular characteristics of the alloy employed. As these alloys often vary greatly in their characteristics, the plates 12 may be made of different thickness in accordance with the particular alloy to be used.

Figure 4:
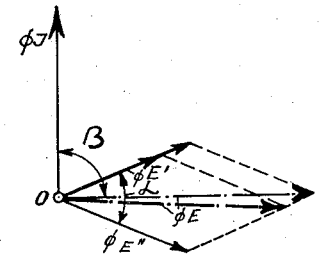
Figure 4 is a vector diagram illustrating the operation of the embodiment shown in Figures 1 to 3.

The whole pressure or voltage driving flux $\phi_E$ comprises the two fluxes $\phi_E'$ and $\phi_E''$, of different phase and flowing through the paths 9 and 10 respectively. As shown in the diagram, Figure 4, as the temperature increases, the flux $\phi_E'$, flowing in the path 9, decreases and therefore the combined flux $\phi_E$ decreases. This action causes the angle between the current driving flux $\phi_I$ and the pressure driving flux $\phi_E$ to be increased. By suitably proportioning the part and thereby the relation of the fluxes $\phi_E'$ and $\phi_E''$, to each other, as well as the angle $\alpha$, the compensation of the magnitude and phase may be controlled in the manner desired so as to compensate for the normal temperature error of the induction meter.

The invention in its broader aspects is not limited to the specific mechanisms shown and described but departures may be made therefrom within the scope of the accompanying claims without departing from the principles of the invention and without sacrificing its chief advantages.

What I claim is:

1. A temperature compensated induction meter having a metering disc, and voltage and current magnets producing a rotating field in which a pressure driving flux member is divided into two branches, one of which functions to compensate by means of a thermosensitive alloy connected thereby having a negative temperature coefficient, while the other branch is under the influence of a short circuited winding.

2. A temperature compensated induction meter having a metering disc, and voltage and current coils and cores and in which a pressure driving flux member is divided into two branches, a thermosensitive alloy having a negative coefficient in one branch and a short circuited winding around the other branch.

3. A temperature compensated induction meter having a metering disc and voltage and current coils and cores, the pressure magnet being provided with a branch carrying the lagging portion of the return magnetic flux, said branch being divided intermediate its ends, one of the divisions being formed with an air gap, a thermally-sensitive alloy having a negative coefficient bridging said gap, and a short-circuiting ring encircling the other division.

4. A temperature compensated induction meter having a metering disc and voltage and current magnets, with the pressure magnet formed with a branch carrying the lagging portion of the return magnetic flux, said branch being divided intermediate its ends into two branches, one of the branches being provided with a thermally-sensitive alloy having a negative temperature coefficient, and a short-circuiting ring encircling the other branch.

EMIL SPAHN.